United States Patent
Cho (10) Patent No.: US 11,287,684 B2
(45) Date of Patent: Mar. 29, 2022

(54) DISPLAY DEVICE WITH AUTOMATIC BRIGHTNESS ADJUSTMENT

(71) Applicants: HKC Corporation Limited, Guangdong (CN); Chongqing HKC Optoelectronics Technology Co., Ltd., Chongqing (CN)

(72) Inventor: En-Tsung Cho, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

(*) Notice: Subject to any disclaimer, the term of this patent is extended or adjusted under 35 U.S.C. 154(b) by 0 days.

(21) Appl. No.: 16/643,122

(22) PCT Filed: Dec. 13, 2017

(86) PCT No.: PCT/CN2017/115867
§ 371 (c)(1),
(2) Date: Feb. 28, 2020

(87) PCT Pub. No.: WO2019/041631
PCT Pub. Date: Mar. 7, 2019

(65) Prior Publication Data
US 2020/0393722 A1    Dec. 17, 2020

(30) Foreign Application Priority Data
Aug. 29, 2017 (CN) .......................... 201710757118.2

(51) Int. Cl.
*G02F 1/1335*  (2006.01)
*G02F 1/1333*  (2006.01)
*G02F 1/1362*  (2006.01)

(52) U.S. Cl.
CPC .... *G02F 1/133514* (2013.01); *G02F 1/13338* (2013.01); *G02F 1/133512* (2013.01); *G02F 1/136222* (2021.01)

(58) Field of Classification Search
CPC combination set(s) only.
See application file for complete search history.

(56) References Cited

U.S. PATENT DOCUMENTS

2005/0117093 A1* 6/2005 Kim .................. G02F 1/133514
349/106
2016/0116798 A1* 4/2016 Nam ................. G02F 1/133528
349/42

FOREIGN PATENT DOCUMENTS

CN    101097335 A    1/2008
CN    101154002 A    4/2008
(Continued)

*Primary Examiner* — Lauren Nguyen
(74) *Attorney, Agent, or Firm* — Muncy, Geissler, Olds & Lowe, P.C.

(57) ABSTRACT

A display panel includes a first substrate, a second substrate, active switches, pixel electrodes, a color filter layer, a light-obstructing layer, a control chip and at least one photosensor. The second substrate is disposed opposite to the first substrate. The active switches are disposed on the second substrate, and each of them comprises an electro-conductive channel. The pixel electrodes are disposed on the second substrate and coupled to the active switches. The color filter layer is disposed on the second substrate and corresponded to the pixel electrodes. The light-obstructing layer is disposed on the first substrate and disposed in correspondence with the electro-conductive channel. The light-obstructing layer covers the electro-conductive channel and is made of an electro-conductive material. The control chip is coupled to the light-obstructing layer. The photosensor is disposed between the first substrate and the light-obstructing layer.

19 Claims, 3 Drawing Sheets

(56) References Cited

FOREIGN PATENT DOCUMENTS

| | | | | |
|---|---|---|---|---|
| CN | 101266529 A | | 9/2008 | |
| CN | 10-6373969 | * | 2/2017 | ........... G02F 1/1335 |
| CN | 106373969 A | | 2/2017 | |
| CN | 107357079 A | | 11/2017 | |
| JP | 2010287593 A | | 12/2010 | |

* cited by examiner

DISPLAY DEVICE WITH AUTOMATIC BRIGHTNESS ADJUSTMENT

BACKGROUND OF THE INVENTION

Field of the Invention

This disclosure relates to a technical field of a display, and more particularly to a display panel.

Related Art

The liquid crystal display has many advantages, such as the thin body, low power consumption, and no radiation, and is widely applied. Most of the liquid crystal displays available in the market are backlight-type liquid crystal displays each comprising a liquid crystal panel and a backlight module. The working principle of the liquid crystal panel is to place the liquid crystal between two parallel glass substrates, and to apply a driving voltage to the two glass substrates to control the orientation of the liquid crystal, so as to refract the light emitted from the backlight module to generate an image frame.

The thin-film-transistor liquid crystal display (TFT-LCD) has the properties comprising the low power consumption, excellent frame quality and higher production yield, and has gradually become the most popular product in the display field. Similarly, the TFT-LCD comprises a liquid crystal panel and a backlight module. The liquid crystal panel comprises a color filter substrate (CF substrate) and a thin-film-transistor substrate (TFT substrate). The opposite inner sides of the aforementioned substrates are configured with transparent electrodes, respectively. A layer of liquid crystal (LC) is interposed between the two substrates. In a display panel, orientations of liquid crystal molecules are controlled through the electric field to change the polarization state of light, and a polarizer is used to implement the penetrating and obstructing conditions of the optical path to implement the display objective. The display brightness of the display panel has the poor effect of automatic adjustment according to the environment.

SUMMARY OF THE INVENTION

The technical problem to be solved by this disclosure is to provide a display panel, which automatically adjusts the display brightness according to the environment brightness.

The objective of this disclosure may be implemented through the following technical solution. A display panel comprises a first substrate, a second substrate, active switches, pixel electrodes, a color filter layer, a light-obstructing layer, a control chip and at least one photosensor. The second substrate is disposed opposite to the first substrate. The active switches are disposed on the second substrate, and each of the active switches comprises an electro-conductive channel. The pixel electrodes are disposed on the second substrate, and coupled to the active switches. The color filter layer is disposed on the second substrate and corresponding to a position of the pixel electrodes. The light-obstructing layer is disposed on the first substrate and is disposed in correspondence with an electro-conductive channel of the active switches. The light-obstructing layer covers the electro-conductive channel of the active switches, and is made of an electro-conductive material. The control chip is coupled to the light-obstructing layer and for adjusting the brightness of the display panel. The photosensor is disposed between the first substrate and the light-obstructing layer.

The photosensor comprises a photodiode.

The area of the PN junction of the photodiode is relatively large in order to receive the incident light. When the photodiode is not illuminated, the reverse current is extremely weak, and when the photodiode is illuminated, the reverse current increases rapidly, and the reaction is sensitive.

The photodiode has the advantages of small junction capacitance, short transit time, high sensitivity and the like.

The first substrate further comprises a transparent electro-conductive layer, and the photosensor is dispose between the transparent electro-conductive layer and the light-obstructing layer.

The original design of the first substrate is not affected, and the transparent electro-conductive layer does not affect the photosensor in acquiring the incident light.

The first substrate further comprises a transparent electro-conductive layer. The photodiode is disposed between the transparent electro-conductive layer and the light-obstructing layer. The light-obstructing layer comprises a metal black matrix. The metal black matrix is coupled to a control chip, and the transparent electro-conductive layer and the metal black matrix are two side electrodes of the photodiode.

The transparent electro-conductive layer (ITO common electrode) of the first substrate and the metal black matrix (BM) are two side electrodes of the photodiode. The metal black matrix (BM) is coupled to the control chip. The liquid crystals are disposed between the light-obstructing layer and the second substrate. The added photodiode almost has no influence on the thickness of the display panel. Because the existing transparent electro-conductive layer (ITO common electrode) and the metal black matrix (BM) are used as the two side electrodes of the photodiode, the modification is small and can be easily implemented.

The photodiode comprises three semiconductor layers. An outer side of a first semiconductor layer of the three semiconductor layers directly connects the transparent electro-conductive layer. An outer side of a third semiconductor layer of the three semiconductor layers directly connects the metal black matrix, and widths of the three semiconductor layers are smaller than a width of the metal black matrix.

The photodiode has a layer of intrinsic semiconductor sandwiched between the P-type semiconductor and the N-type semiconductor. Because the intrinsic semiconductor layer is a high-resistance area relative to a P area and an N area, the internal electric field of the PN junction is basically fully concentrated in the I layer. An N-type semiconductor layer having the very low concentration is doped into the middle of the PN junction of the photodiode to increase the width of the depletion area, decrease the influence of diffusion movement, and improve the objective of the response speed. Because the doping concentration of this doped layer is low (almost approaches the concentration of the intrinsic semiconductor), the doped layer is also referred to as the I layer, and this structure thus becomes the photodiode. The I layer is thicker, and almost occupies the whole depletion area. Most of the incident light is absorbed by the I layer and a large number of electron-hole pairs are generated. The P-type and N-type semiconductors with the high doping concentrations are disposed on two sides of the I layer. The P layer and the N layer are very thin, and absorb a small proportion of the incident light. Thus, drift components in the light-induced current occupy the leading position, and this greatly increases the response speed. Therefore, the photodiode has the advantages of small junction capacitance, short transit time, high sensitivity and the like.

The photosensor is disposed on a periphery of a display area of the display panel.

Without affecting the displaying of the display area and having little influence on the display panel, the photosensor is closer to the display area, and acquires the external environment light more accurately. A control circuit of the photosensor may be disposed outside the display area, and the displaying of the display panel is not affected.

The control circuit controlling the photosensor is disposed on one edge of the display area of the display panel.

It can save the space, does not additionally increase the width, and is especially suitable for the narrow border and borderless display panels.

The photosensor is disposed on an upper lateral side and left and right lateral sides of the display area of the display panel. A lower lateral side of the display area of the display panel is provided with the control circuit controlling the photosensor.

The photosensor disposing on the upper lateral side and the left and right lateral sides of the display area of the display panel can acquire the external environment light more comprehensively, acquire a wider range, and make the reaction more sensitive and comprehensive. The lower lateral side of the display area is provided with the control circuit controlling the photosensor, and it can save the space, does not additionally increase the width, and is especially suitable for the narrow border and borderless display panels.

The photosensor is disposed on two lateral sides of the display area, and on the top edge of the display area away from the support base of the display panel.

The photosensor is disposed at the center position of the display area. The human's visual center is located at the center position of the display area, and is most sensitive to the brightness of the position. Hence, a very good dimming effect can be achieved by just disposing the photosensor at the center position, and only one photosensor is needed. Therefore, the cost is cheaper.

The photosensor is just disposed at the arbitrary position in the display area of the display panel. A light sensor can be disposed at arbitrary position in the display area to facilitate the disposing of the photosensor.

The objective of this disclosure may further be implemented through the following technical solution. A display panel comprises a first substrate, a second substrate, active switches, pixel electrodes, a color filter layer, a light-obstructing layer and at least one photosensor. The second substrate is disposed opposite to the first substrate. The active switches are disposed on the second substrate, and each of the active switches comprises an electro-conductive channel. The pixel electrodes are disposed on the second substrate, and coupled to the active switches. The color filter layer is disposed on the second substrate and corresponding to a position of the pixel electrodes. The light-obstructing layer is disposed on the first substrate and is disposed in correspondence with an electro-conductive channel of the active switches. The light-obstructing layer covers the electro-conductive channel of the active switches. The photosensor is disposed between the first substrate and the light-obstructing layer. A width of the photosensor is smaller than or equal to a width of the light-obstructing layer, and the photosensor comprises a photodiode. In addition, a transparent electro-conductive layer is disposed on the first substrate. The photodiode is disposed between the transparent electro-conductive layer and the light-obstructing layer. The light-obstructing layer comprises a metal black matrix, the metal black matrix is coupled to the control chip adjusting the brightness of the display panel, and the transparent electro-conductive layer and the metal black matrix are two side electrodes of the photodiode. The photosensor is disposed between the first substrate and the light-obstructing layer, and the width of the photosensor is smaller than the width of the light-obstructing layer. The first substrate of the display panel faces the user, and the first substrate is a transparent substrate. The external environment light can enter the display panel through the first substrate, and the photosensor can acquire the external environment light entering through the first substrate. Thus, different electrical signals are outputted according to the intensity of the external environment light, so that the adjusting of the display brightness is achieved according to the environment brightness level. The light-obstructing layer is also provided on the inner side of the photosensor, the width of the light-obstructing layer is greater than or equal to the width of the photosensor, and the light-obstructing layer can completely obstruct the backlight at the photosensor, so that the photosensor acquires the external environment light and is not affected by the backlight, and the photosensor acquires the external environment light more accurately. In addition, the photosensor is disposed inside the display panel, closer to the display area, and acquires the external environment light, which affects the display area, more accurately.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

Specific structures and function details disclosed herein are only for the illustrative purpose for describing the exemplary embodiment of this disclosure. However, this disclosure can be specifically implemented through many replacements, and should not be explained as being restricted to only the embodiment disclosed herein.

In the description of this disclosure, it is to be understood that the terms "center", "transversal", "up," "down," "left," "right," "vertical", "horizontal", "top," "bottom," "inside" and "outside" indicating the orientation or position relationships are the orientation or position relationships based on the drawing, are only provided for the purposes of describing this disclosure and simplifying the description, but do not indicate or imply that the directed devices or elements must have the specific orientations or be constructed and operated in the specific orientations, and thus cannot be understood as the restriction to this disclosure. In addition, the terms "first," and "second" are used for the illustrative purpose only and cannot be understood as indicating or implying the relative importance or implicitly specifying the number of indicated technical features. Therefore, the features restricted by "first" and "second" may expressly or implicitly comprise one or multiple ones of the features. In the description of this disclosure, unless otherwise described, the meaning of "multiple" comprises two or more than two. In addition, the terms "comprises" and any modification thereof intend to cover the non-exclusive inclusions.

In the description of this disclosure, it needs to be described that, unless otherwise expressly stated and limited, the terms "mount," "link" and "connect" should be broadly understood. For example, they may be the fixed connection, may be the detachable connection or may be the integral connection; may be the mechanical connection or may also be the electrical connection; or may be the direct connection, may be the indirect connection through a middle medium or may be the inner communication between two elements. It will be apparent to those skilled in the art that the specific meanings of the above terms in this application may be understood according to the specific conditions.

The terms used herein are for the purpose of describing only specific embodiments and are not intended to limit the exemplary embodiments. Unless the contexts clearly indicate otherwise, the singular form "one," "a" and "an" used here further intend to include plural forms. It should also be understood that the terms "comprising" and/or "including" are used herein to describe the features to describe the presence of stated features, integers, steps, operations, units and/or elements without excluding the presence or addition of one or more other features, integers, steps, operations, units, elements, and/or combinations thereof.

This disclosure will be described in detail according to the preferred embodiment with reference to the drawings.

A display panel of an embodiment of this disclosure will be described with reference to FIGS. 1 to 4.

Figure 1:
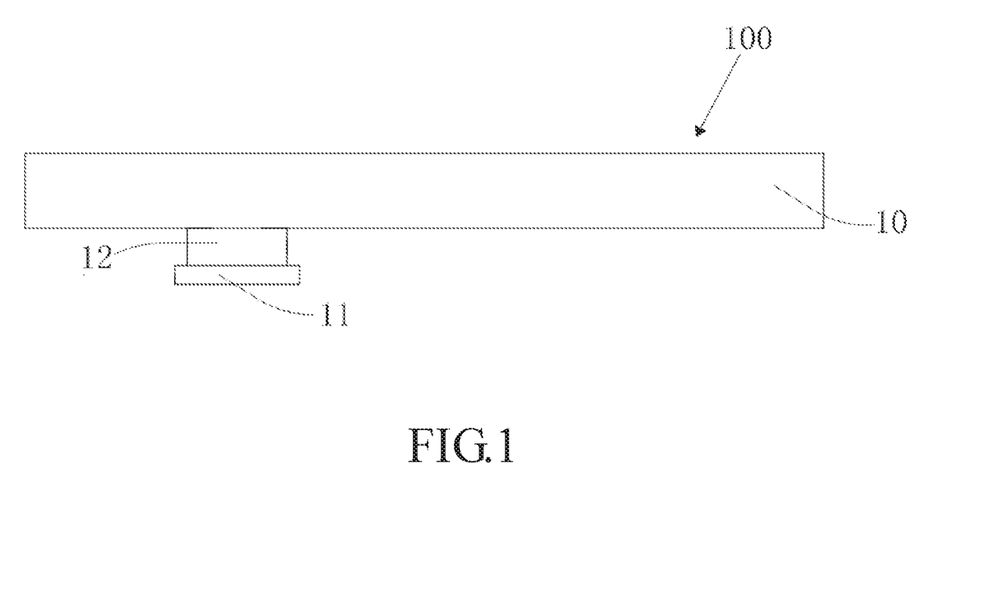
FIG. 1 is a schematic view showing a first substrate of an embodiment of this disclosure.
Figure 4:
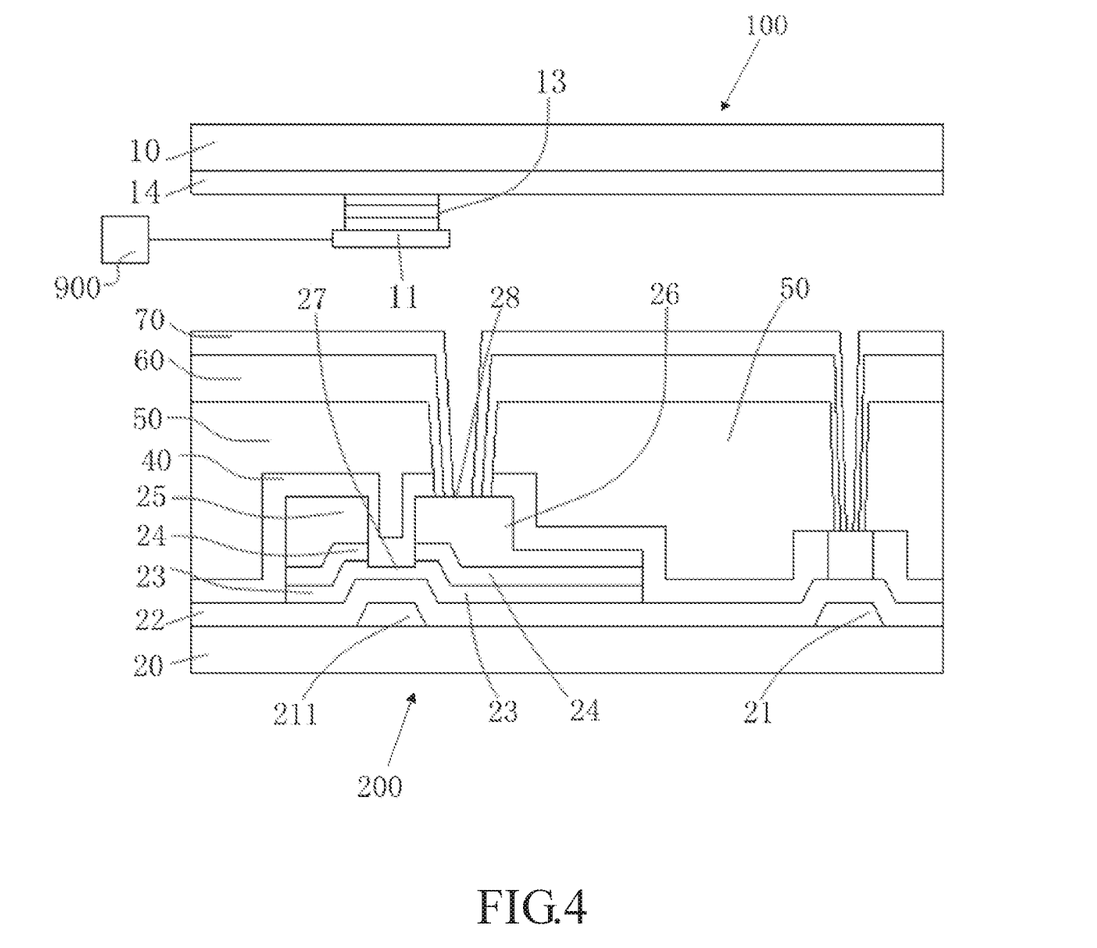
FIG. 4 is a schematic view showing a display panel of the embodiment of this disclosure.

Referring to FIGS. 1 and 4, the display panel in the embodiment of FIGS. 1 and 4 comprises a first substrate 10, a second substrate 20, active switches, pixel electrodes (not shown in the figures), a color filter layer 50, a light-obstructing layer 11, a control chip 900 and a photosensor 12. The first substrate 10 is disposed opposite to the second substrate 20, the active switches are disposed on the second substrate 20, and each of the active switches comprises an electro-conductive channel. The pixel electrodes are disposed on the second substrate, and coupled to the active switches. The color filter layer is disposed on the second substrate, and corresponding to the position of the pixel electrodes. The light-obstructing layer 11 is disposed on the first substrate 10, and the light-obstructing layer 11 is disposed in correspondence with an electro-conductive channel 27 of the active switches. The light-obstructing layer 11 covers the electro-conductive channel 27 of the active switches, and the light-obstructing layer 11 is made of an electro-conductive material. The control chip 900 is coupled to the light-obstructing layer 11 and for adjusting the brightness of the display panel. The photosensor 12 is disposed between the first substrate 10 and the light-obstructing layer 11, and a width of the photosensor 12 is smaller than or equal to a width of the light-obstructing layer 11.

The photosensor 12 is disposed between the first substrate 10 and the light-obstructing layer 11, and the width of the photosensor 12 is smaller than the width of the light-obstructing layer 11. The first substrate 10 of the display panel faces the user, the first substrate 10 is a transparent substrate, the external environment light can enter through the first substrate 10, and the photosensor 12 can acquire the external environment light entering through the first substrate 10. Thus, different electrical signals are outputted according to the intensity of the external environment light, so that the adjusting of the display brightness is achieved according to the environment brightness level. The light-obstructing layer 11 is also provided on the inner side of the photosensor 12, the width of the light-obstructing layer 11 is greater than or equal to the width of the photosensor 12, and the light-obstructing layer 11 can completely obstruct the backlight at the photosensor 12, so that the photosensor 12 acquires the external environment light and is not affected by the backlight, and the photosensor 12 acquires the external environment light more accurately. In addition, the photosensor 12 is disposed inside the display panel, is closer to the display area, and acquires the external environment light, which affects the display area, more accurately. In addition, the light-obstructing layer 11 is disposed in correspondence with the electro-conductive channel 27 of the active switches, and covers the electro-conductive channel 27 of the active switches. The area corresponding to the active switches is not inside the display area, and the light-obstructing layer 11 is disposed to cover the electro-conductive channel 27 of the active switches. This can not decrease the aperture rate, can also prevent the external environment light on the front side of the display panel from irradiating to affect the electro-conductive channel 27 of the active switches, can further decrease the concentration of photo-generated carrier, and can improve the operation property of the device. Optionally, the photosensor 12 may include an individually packaged photosensor having two leading signal lines connected to the control chip. Preferably, the photosensor 12 comprises a photodiode. An area of the PN junction of the photodiode is relatively large in order to receive the incident light. When the photodiode is not illuminated, the reverse current is extremely weak. In addition, when the photodiode is illuminated, the reverse current increases rapidly, and the reaction is sensitive. More preferably, the photosensor 12 comprises a photodiode. The photodiode has the advantages of small junction capacitance, short transit time, high sensitivity and the like.

Figure 2:
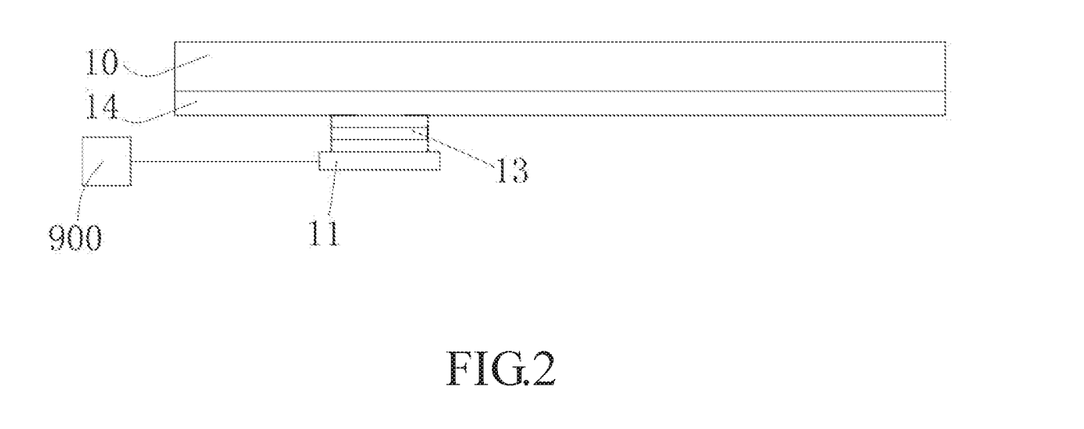
FIG. 2 is another schematic view showing the first substrate of the embodiment of this disclosure.

As shown in FIG. 2, the display panel in the embodiment of FIG. 2 comprises the first substrate 10, and the first substrate 10 comprises the light-obstructing layer 11 and the photosensor. The light-obstructing layer 11 is disposed on the first substrate 10. The photosensor is disposed between the first substrate 10 and the light-obstructing layer 11, and the width of the photosensor is smaller than or equal to the width of the light-obstructing layer 11.

The photosensor comprises a photodiode 13. The photodiode 13 has the advantages of small junction capacitance, the short transit time, the high sensitivity and the like.

The first substrate 10 further comprises a transparent electro-conductive layer 14 disposed between the first substrate 10 and the photosensor. The original design of the first substrate 10 is not affected, the transparent electro-conductive layer 14 (ITO common electrode) does not affect the photosensor in acquiring the incident light. The photosensor is the photodiode 13. The light-obstructing layer 11 comprises a metal black matrix 11, and the metal black matrix 11 is coupled to the control chip 900. The transparent electro-conductive layer 14 and the metal black matrix 11 are two side electrodes of the photodiode 13. The transparent electro-conductive layer 14 (ITO common electrode) of the first substrate 10 and the metal black matrix (BM) 11 are two side electrodes of the photodiode 13. The metal black matrix (BM) 11 is coupled to the control chip 900. The liquid crystals are disposed between the light-obstructing layer 11 and the second substrate 20, wherein the addition of the photodiode 13 almost has no influence on the thickness of the display panel. Because the existing transparent electro-conductive layer 14 (ITO common electrode) and the metal black matrix (BM) 11 are two side electrodes of the photodiode 13, the modification is small and can be easily implemented.

The photodiode 13 comprises three semiconductor layers. An outer side of a first semiconductor layer of the three semiconductor layers directly connects the transparent electro-conductive layer 14. An outer side of a third semiconductor layer of the three semiconductor layers directly connects a metal black matrix 11, and widths of the three semiconductor layers are smaller than a width of the metal black matrix 11. The photodiode 13 has a layer of intrinsic semiconductor sandwiched between the P-type semiconductor and the N-type semiconductor. Because the intrinsic semiconductor layer is a high-resistance area relative to a P area and an N area, the internal electric field of the PN junction is basically fully concentrated in the I layer. An N-type semiconductor layer having the very low concentration is doped into the middle of the PN junction of the photodiode to increase the width of the depletion area, decrease the influence of diffusion movement, and improve the objective of the response speed. Because the doping concentration of this doped layer is low (almost approaches the concentration of the intrinsic semiconductor), the doped layer is also referred to as the I layer, and this structure thus becomes the photodiode 13. The I layer is thicker, and almost occupies the whole depletion area. Most of the incident light is absorbed by the I layer and a large number of electron-hole pairs are generated. The P-type and N-type semiconductors with the high doping concentrations are disposed on two sides of the I layer. The P layer and the N layer are very thin, and absorb a small proportion of the incident light. Thus, drift components in the light-induced current occupy the leading position, and this greatly increases the response speed. Therefore, the photodiode 13 has the advantages of small junction capacitance, short transit time, high sensitivity and the like.

Figure 3:
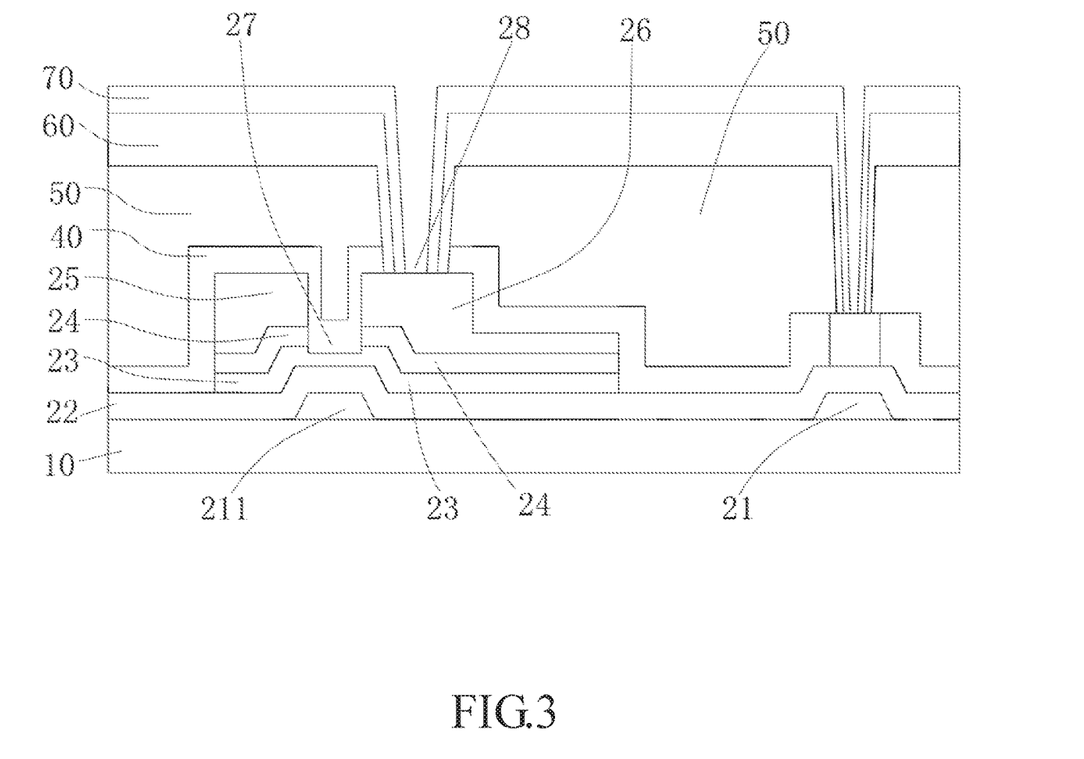
FIG. 3 is a schematic view showing a second substrate of the embodiment of this disclosure.

As shown in FIGS. 3 and 4, the display panel in the embodiment of FIGS. 3 and 4 comprises the first substrate 10, and the first substrate 10 comprises the light-obstructing layer 11 and the photosensor. The light-obstructing layer 11 is disposed on the first substrate 10. The photosensor is disposed between the first substrate 10 and the light-obstructing layer 11, and the width of the photosensor is smaller than or equal to the width of the light-obstructing layer 11.

The photosensor is disposed between the first substrate 10 and the light-obstructing layer 11, and the width of the photosensor is smaller than the width of the light-obstructing layer 11. The first substrate 10 of the display panel faces the user, the first substrate 10 is a transparent substrate. The external environment light can enter the display panel through the first substrate 10, and the photosensor can acquire the external environment light entering through the first substrate 10. Thus, different electrical signals are outputted according to the intensity of the external environment light, so that the adjusting of the display brightness is achieved according to the environment brightness level. The light-obstructing layer 11 is also provided on the inner side of the photosensor, the width of the light-obstructing layer 11 is greater than or equal to the width of the photosensor, and the light-obstructing layer 11 can completely obstruct the backlight at the photosensor, so that the photosensor acquires the external environment light and is not affected by the backlight, and the photosensor acquires the external environment light more accurately. In addition, the photosensor is disposed inside the display panel, closer to the display area, and acquires the external environment light, which affects the display area, more accurately.

Optionally, the photosensor may comprises an individually packaged photosensor having two leading signal lines connected to the control chip 900. Preferably, the photosensor comprises the photodiode. The area of the PN junction of the photodiode is relatively large in order to receive the incident light. When the photodiode is not illuminated, the reverse current is extremely weak; and when the photodiode is illuminated, the reverse current increases rapidly, and the reaction is sensitive. More preferably, the photosensor comprises the photodiode 13. The photodiode 13 has the advantages of small junction capacitance, short transit time, high sensitivity and the like.

The first substrate 10 further comprises the transparent electro-conductive layer 14, and the transparent electro-conductive layer 14 is disposed between the first substrate 10 and the photodiode 13. The light-obstructing layer 11 comprises the metal black matrix 11, and the metal black matrix 11 is coupled to the control chip 900 adjusting the brightness of the display panel. The transparent electro-conductive layer 14 and the metal black matrix 11 are two side electrodes of the photodiode 13. The transparent electro-conductive layer 14 (ITO common electrode) of the first substrate 10 and the metal black matrix (BM) 11 are two side electrodes of the photodiode 13. The metal black matrix (BM) 11 is coupled to the control chip 900. The liquid crystals are disposed between the light-obstructing layer 11 and the second substrate 20, wherein the addition of the photodiode 13 almost has no influence on the thickness of the display panel. Because the existing transparent electro-conductive layer 14 (ITO common electrode) and the metal black matrix (BM) 11 are two side electrodes of the photodiode 13, the modification is small and can be easily implemented.

The photodiode 13 comprises three semiconductor layers. An outer side of a first semiconductor layer of the three semiconductor layers directly connects the transparent electro-conductive layer 14, an outer side of a third semiconductor layer of the three semiconductor layers directly connects a metal black matrix 11, and widths of the three semiconductor layers are smaller than a width of the metal black matrix 11. The photodiode 13 has a layer of intrinsic semiconductor sandwiched between the P-type semiconductor and the N-type semiconductor. Because the intrinsic semiconductor layer is a high-resistance area relative to a P area and an N area, the internal electric field of the PN junction is basically fully concentrated in the I layer. An N-type semiconductor layer having the very low concentration is doped into the middle of the PN junction of the photodiode to increase the width of the depletion area, decrease the influence of diffusion movement, and improve the objective of the response speed. Because the doping concentration of this doped layer is low (almost approaches the concentration of the intrinsic semiconductor), the doped layer is also referred to as the I layer, and this structure thus becomes the photodiode 13. The I layer is thicker, and almost occupies the whole depletion area. Most of the incident light is absorbed by the I layer and a large number of electron-hole pairs are generated. The P-type and N-type semiconductors with the high doping concentrations are disposed on two sides of the I layer. The P layer and the N layer are very thin, and absorb a small proportion of the incident light. Thus, drift components in the light-induced current occupy the leading position, and this greatly increases the response speed. Therefore, the photodiode 13 has the advantages of small junction capacitance, short transit time, high sensitivity and the like.

Optionally, the photosensor is disposed on the periphery of the display area of the display panel, and this does not affect the displaying of the display area, and has little influence on the display panel. The photosensor is closer to the display area, and acquires the external environment light more accurately. The control circuit of the photosensor may be disposed outside the display area, and the displaying of the display panel is not affected.

Optionally, the control circuit controlling the photosensor is disposed on one edge of the display area of the display panel. This can save the space, does not additionally increase the width, and is especially suitable for the narrow border and borderless display panels.

Preferably, the photosensor is disposed on an upper lateral side and left and right lateral sides of the display area of the display panel. A non-display area corresponding to the lower lateral side of the display area of the display panel is provided with the control circuit controlling the photosensor. The photosensor disposing on the upper lateral side and the left and right lateral sides of the display area of the display panel can acquire the external environment light more comprehensively, acquire a wider range, and make the reaction more sensitive and comprehensive. The lower lateral side of the display area is provided with the control circuit controlling the photosensor, and this can save the space, does not additionally increase the width, and is especially suitable for the narrow border and borderless display panels.

Optionally, the photosensor is disposed at the center position of the display area. The human's visual center is located at the center position of the display area, and is most sensitive to the brightness of the position. Thus, a very good dimming effect can be achieve by only disposing the photosensor at the center position, and only one photosensor is needed, so the cost is cheaper.

Optionally, the photosensor is only disposed at the arbitrary position in the display area of the display panel. A light sensor can be disposed at arbitrary position in the display area to facilitate the disposing of the photosensor.

The display panel comprises the second substrate 20, and a first layer of wires 21 is disposed on the second substrate 20. An insulation medium layer 22 is disposed on the first layer of wires 21. An amorphous silicon layer 23 corresponding to a gate wire segment 211 of the first layer of wires 21 is disposed on the insulation medium layer 22, and an Ohmic contact layer 24 corresponding to the amorphous silicon layer 23 is disposed on the amorphous silicon layer 23. The Ohmic contact layer 24 is provided with a source wire segment 25 and a drain wire segment 26 separated from each other. The electro-conductive channel 27 is disposed between the source wire segment 25 and the drain wire segment 26, and the electro-conductive channel 27 passes through the Ohmic contact layer 24. The bottom of the channel is the amorphous silicon layer 23. A first protection layer 40 is disposed on the source wire segment 25 and the drain wire segment 26, a color filter layer (CF layer) 50 is disposed on the first protection layer 40, a second protection layer 60 is disposed on the CF layer 50, a pixel electrode layer 70 is disposed on the second protection layer 60, and a through hole 28 corresponding to the drain wire segment 26 is formed in the pixel electrode layer 70. The pixel electrode layer 70 is connected to the drain wire segment 26 through the through hole 28, and the through hole 28 passes through the pixel electrode layer 70, the second protection layer 60, the CF layer 50 and the first protection layer 40.

Optionally, the widths of the source wire segment 25 and the drain wire segment 26 are equal to the width of the amorphous silicon layer 23. The first protection layer 40 on the outer side of the source wire segment 25 directly connects the insulation medium layer 22, and the amorphous silicon layer 23, the Ohmic contact layer 24 and the drain wire segment 26 corresponding to the through hole 28 are disposed above the insulation medium layer 22.

Optionally, the widths of the source wire segment 25 and the drain wire segment 26 are greater than the width of the amorphous silicon layer 23. One side of the source wire segment 25 exceeding the amorphous silicon layer 23 is directly connected to the insulation medium layer 22, the other side of the source wire segment 25 is directly connected to the low dielectric constant protection layer, and the portion of the insulation medium layer 22 corresponding to the through hole 28 is connected between the drain wire segment 26.

In the above-mentioned embodiment, the pixel may be the three-color pixels of red, green and blue, may also be the four-color pixels of red, green, blue and white, and may also be the four-color pixels of red, green, blue and yellow.

In the above-mentioned embodiment, the amorphous silicon layer adopts the a-Si material. Of course, other semiconductor layer materials may also be adopted.

In the above-mentioned embodiment, the materials of the first substrate and the second substrate can be glass, plastic, resin or the like.

In the above-mentioned embodiment, the display panel comprises a liquid crystal panel, an OLED panel, a curved panel, a plasma panel, and the likes. Taking a liquid crystal panel as an example, the liquid crystal panel comprises an array substrate (i.e., the second substrate) and a color filter substrate (i.e., the first substrate), and the array substrate is disposed opposite to the color filter substrate. The liquid crystal molecules and photo spacers are disposed between the array substrate and the color filter substrate.

In the above-mentioned embodiment, the color filter layer and the array of active switches may be disposed on the same substrate. The array substrate may include the color filter layer.

In the above-mentioned embodiment, the display panel of this disclosure may be a curved panel. Each of the active switches of this disclosure may optionally be a thin-film-transistor (TFT).

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A display panel comprising:
    a first substrate, wherein the first substrate comprises a transparent electro-conductive layer;
    a second substrate disposed opposite to the first substrate;
    active switches disposed on the second substrate, wherein each of the active switches comprises an electro-conductive channel;
    pixel electrodes disposed on the second substrate and coupled to the active switches;
    a color filter layer disposed on the second substrate and corresponding to a position of the pixel electrodes;
    a light-obstructing layer disposed on the first substrate, wherein the light-obstructing layer is disposed in correspondence with the electro-conductive channel of the active switches, the light-obstructing layer covers the electro-conductive channels of the active switches, and the light-obstructing layer is made of an electro-conductive material, the light-obstructing layer comprises a metal black matrix;

a control chip disposed separately from the light-obstructing layer, coupled to the light-obstructing layer through signal lines and configured to adjust a brightness of the display panel; and at least one photosensor disposed between the first substrate and the light-obstructing layer, wherein the transparent electro-conductive layer is disposed between the first substrate and the photosensor, wherein the photosensor comprises a photodiode, the metal black matrix is coupled to the control chip, the transparent electro-conductive layer and the metal black matrix are two side electrodes of the photodiode, wherein the photosensor acquires external environment light entering through the first substrate and outputs an electrical signal according to an intensity of the external environment light, the control chip adjusts the brightness of the display panel according to the electrical signal.

2. The display panel according to claim 1, wherein the photodiode is disposed between the transparent electro-conductive layer and the light-obstructing layer.

3. The display panel according to claim 2, wherein the photodiode comprises three semiconductor layers, an outer side of a first semiconductor layer of the three semiconductor layers directly connects the transparent electro-conductive layer, an outer side of a third semiconductor layer of the three semiconductor layers directly connects the metal black matrix, and widths of the three semiconductor layers are smaller than a width of the metal black matrix.

4. The display panel according to claim 1, wherein the photosensor is disposed between the transparent electro-conductive layer and the light-obstructing layer.

5. The display panel according to claim 1, wherein a width of the photosensor is smaller than or equal to a width of the light-obstructing layer.

6. The display panel according to claim 1, wherein the photosensor is disposed on a periphery of a display area of the display panel.

7. The display panel according to claim 6, wherein a control circuit controlling the photosensor is disposed on one edge of the display area.

8. The display panel according to claim 7, wherein the photosensor is disposed on an upper lateral side and left and right lateral sides of the display area, and a lower lateral side of the display area is provided with the control circuit.

9. The display panel according to claim 6, wherein the photosensor is disposed on two lateral sides of the display area, and on a top edge of the display area away from a support base of the display panel.

10. The display panel according to claim 1, wherein the photosensor is disposed in a display area of the display panel.

11. The display panel according to claim 10, wherein the photosensor is disposed at a center position of the display area.

12. A display panel comprising:
a first substrate;
a second substrate disposed opposite to the first substrate;
active switches disposed on the second substrate, wherein each of the active switches comprises an electro-conductive channel;
pixel electrodes disposed on the second substrate and coupled to the active switches;
a color filter layer disposed on the second substrate and corresponding to a position of the pixel electrodes;
a light-obstructing layer disposed on the first substrate, wherein the light-obstructing layer is disposed in correspondence with the electro-conductive channel of the active switches, and the light-obstructing layer covers the electro-conductive channel of the active switches;
at least one photosensor disposed between the first substrate and the light-obstructing layer, wherein a width of the photosensor is smaller than or equal to a width of the light-obstructing layer, and the photosensor comprises a photodiode; and
a transparent electro-conductive layer, wherein the transparent electro-conductive layer is disposed on the first substrate, the photodiode is disposed between the transparent electro-conductive layer and the light-obstructing layer, the light-obstructing layer comprises a metal black matrix, the metal black matrix is coupled through signal lines to a control chip configured to adjust a brightness of the display panel, and the transparent electro-conductive layer and the metal black matrix are two side electrodes of the photodiode,
wherein the control chip is disposed separately from the light-obstructing layer,
wherein the transparent electro-conductive layer is disposed between the first substrate and the photosensor,
wherein the photosensor acquires external environment light entering through the first substrate and outputs an electrical signal according to an intensity of the external environment light, the control chip adjusts the brightness of the display panel according to the electrical signal.

13. The display panel according to claim 12, wherein the photodiode comprises three semiconductor layers, an outer side of a first semiconductor layer of the three semiconductor layers directly connects the transparent electro-conductive layer, an outer side of a third semiconductor layer of the three semiconductor layers directly connects the metal black matrix, and widths of the three semiconductor layers are smaller than a width of the metal black matrix.

14. The display panel according to claim 12, wherein the photosensor is disposed on a periphery of a display area of the display panel.

15. The display panel according to claim 14, wherein a control circuit controlling the photosensor is disposed on one edge of the display area.

16. The display panel according to claim 15, wherein the photosensor is disposed on an upper lateral side and left and right lateral sides of the display area, and a lower lateral side of the display area is provided with the control circuit.

17. The display panel according to claim 14, wherein the photosensor is disposed on two lateral sides of the display area, and on a top edge of the display area away from a support base of the display panel.

18. The display panel according to claim 12, wherein the photosensor is disposed in a display area of the display panel.

19. The display panel according to claim 18, wherein the photosensor is disposed at a center position of the display area.

* * * * *